Figure 1:
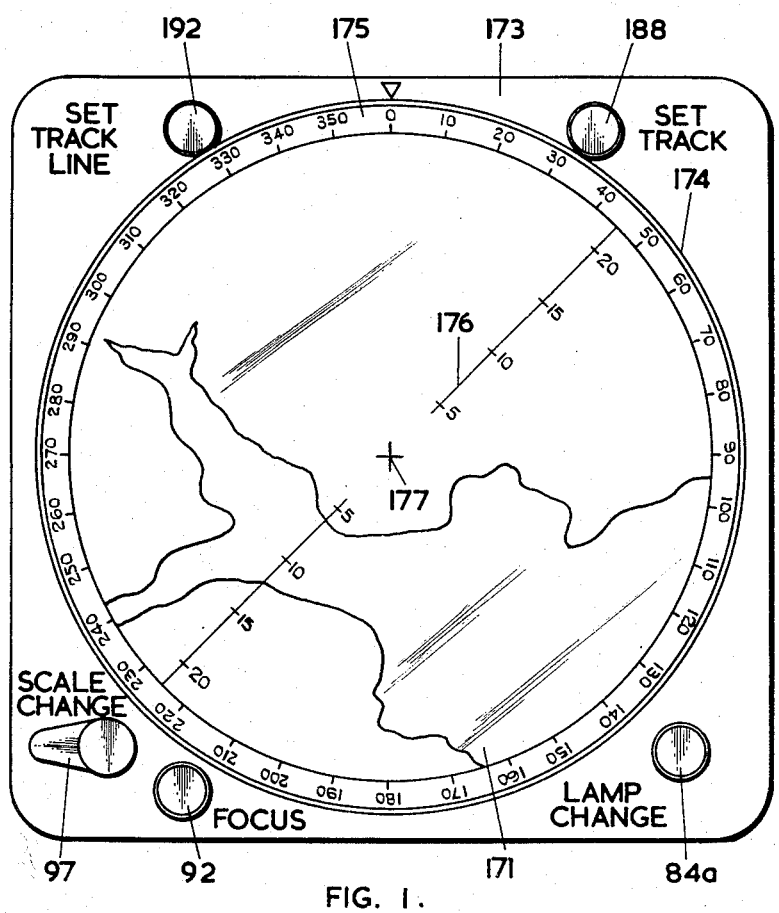

March 30, 1965     K. R. HONICK     3,175,460

POSITION AND TRACK LOCATING APPARATUS

Filed Oct. 24, 1961     11 Sheets-Sheet 1

March 30, 1965 K. R. HONICK 3,175,460
POSITION AND TRACK LOCATING APPARATUS
Filed Oct. 24, 1961 11 Sheets-Sheet 4

Kenneth Robert Honick
Inventor

By
Cushman, Darby & Cushman
Attorneys

March 30, 1965 K. R. HONICK 3,175,460
POSITION AND TRACK LOCATING APPARATUS
Filed Oct. 24, 1961 11 Sheets-Sheet 5

Kenneth Robert Honick
Inventor

By
Cushman, Darby r Cushman
Attorneys

March 30, 1965 K. R. HONICK 3,175,460
POSITION AND TRACK LOCATING APPARATUS
Filed Oct. 24, 1961 11 Sheets-Sheet 6

Kenneth Robert Honick
Inventor

By Cushman, Darby & Cushman
Attorneys

March 30, 1965  K. R. HONICK  3,175,460
POSITION AND TRACK LOCATING APPARATUS
Filed Oct. 24, 1961  11 Sheets-Sheet 8

Kenneth Robert Honick
Inventor

By
Cushman, Darby & Cushman
Attorneys

United States Patent Office 3,175,460
Patented Mar. 30, 1965

3,175,460
POSITION AND TRACK LOCATING APPARATUS
Kenneth Robert Honick, Aldershot, England, assignor to Minister of Aviation, in Her Majesty's Government of the United Kingdom of Great Britain and Northern Ireland, Strand, London, England
Filed Oct. 24, 1961, Ser. No. 147,264
Claims priority, application Great Britain, Oct. 26, 1960, 36,734/60
5 Claims. (Cl. 88—24)

This invention relates to navigation apparatus and especially to display apparatus for operation under the control of signals corresponding to distance travelled in two cardinal directions, to present a continuous indication of the position of a craft.

According to the invention, apparatus for displaying topographically the present position of a craft as defined by two computed navigational signals corresponding to distance travelled in two cardinal directions, respectively, comprises:

A fixed viewing frame,

An enlarging optical projection system including a rear projection screen in said frame, A fixed index defining a point within the viewing frame and representative of present position of the craft, Means for locating a topographical microtransparency for projection of an image of part thereof at a time on the screen, and, Translational motor means for imparting to a topographical micro-transparency so located two translational motions in two cardinal directions transversely of the optical axis, under the control of the two computed navigational signals, respectively, and so moving the projected topographical image over the screen with respect to the present position index in accordance with the motion relative to a craft of the terrain represented by said topographical micro-transparency.

It is a feature of the invention to provide a track line index in the form of a straight line intersecting the optical axis and extending across the viewing frame and which is movable angularly about said axis to indicate track. It will be seen that so long as a craft is on a particular course, i.e. following a straight track, such track line index will extend over, and so indicate on the projected topographical image in the viewing frame, not only past positions and the present position of the craft, but also what will be its future positions if that course is held. The track line index thus affords a simple and convenient means for determining at any time just what change of course, if any, is necessary in order to reach a required position.

Conveniently, the rear projection screen will be circular and centered on the optical axis of the projection system and the viewing frame will be formed with a circular opening and have an annular compass card, both of which are concentric with the screen.

From the point of view of a navigator or observer in craft it is desirable, in general, that the topographical image should be geographically, say North, stabilised in the viewing frame with only translational motion relative to the latter, say with North always at the top of the frame. It is a feature of the invention to provide track line motor means, for use during operation in geographically stabilised mode, for angularly moving the track line index under the control of a computed track signal, so that said index may read track against the above-mentioned annular compass card where provided.

For a pilot, however, it may be more convenient for the topographical image to be track stabilised in the viewing frame with the direction of the resultant translational movement of the image always the same, say from top to bottom. According to a feature of the invention, for track stabilisation, track means are provided for angularly moving the image about the optical axis under the control of a computed track signal. Preferably, the means for locating a micro-transparency for projection include a carrier which is rotatable about the optical axis and track motor means are provided for imparting angular motion to said carrier and so to a micro-transparency located for projection. Preferably also, the annular compass card, where provided, is mounted for angular motion about the optical axis and means are provided for angularly moving it together with the image on the screen under the control of the computed track signal, to indicate track.

Apparatus according to the invention may have provision for operation in both geographically and track stabilised modes and selector means for selecting operation in whichever of the two modes is required at any time.

For use over terrain areas larger than can be covered conveniently by a single topographical micro-transparency, the means for locating a micro-transparency may have accommodation for a length of film bearing as successive frames along its length a series of topographical microtransparencies each covering a corresponding section of a large terrain area covered by the series. The microtransparencies may be disposed in successive groups, each containing the same number of micro-transparencies, along the length of the film, said groups covering strips of terrain which are disposed in succession in the direction corresponding to the transverse dimension of the film. With this disposition of the micro-transparencies on the film longitudinal and transverse motor means may be provided which have two drives for moving the film simultaneously in two cardinal directions longitudinally and transversely thereof and which are of relative speed ratios appropriate to move the film the same number of micro-transparencies along its length as there are microtransparencies in each group in the same time as is taken to move the film transversely through a distance equal substantially to the dimension of a micro-transparency transversely of the film, and in this way rapidly change from one micro-transparency covering a section of one terrain strip to a micro-transparency covering the adjacent terrain section of an adjacent terrain strip.

In general, manual control means are provided for translationally moving a micro-transparency and for angularly moving the track line index and the rotatable carrier of the transparency locating means where provided, under manual control instead of under computed navigational signal control. Such manual control means may include signal means affording signals of the same character as that of the computed navigational signals employed in any particular case, and also, if desired, manually controlled motor means for operating such signal means.

In cases where longitudinal and transverse motor means as above set forth are provided, these are preferably of signal operated type and automatic motor driven signal means are provided for affording a longitudinal and transverse signal for long enough at a time to effect a change from a transparency in one group to the corresponding transparency in an adjacent group along the length of the film.

In general also, the computed navigational distance signals, are afforded by navigational computer means having provision for storing the signals in known manner, so that during adjustment of a transparency translationally or when changing from one transparency to another, the signals can be held in the computer until the adjustment is completed and then fed therefrom once again to produce the corresponding motions at relatively high speed until, so to speak, the stored information is discharged, with the result, that the projected image will move translationally at relatively high speed until it has "caught up" and once again indicates correctly against the present position index.

The invention is illustrated by way of example in the accompanying diagrammatic drawings of which:

FIGURE 1 is a front view, and

Figure 2:
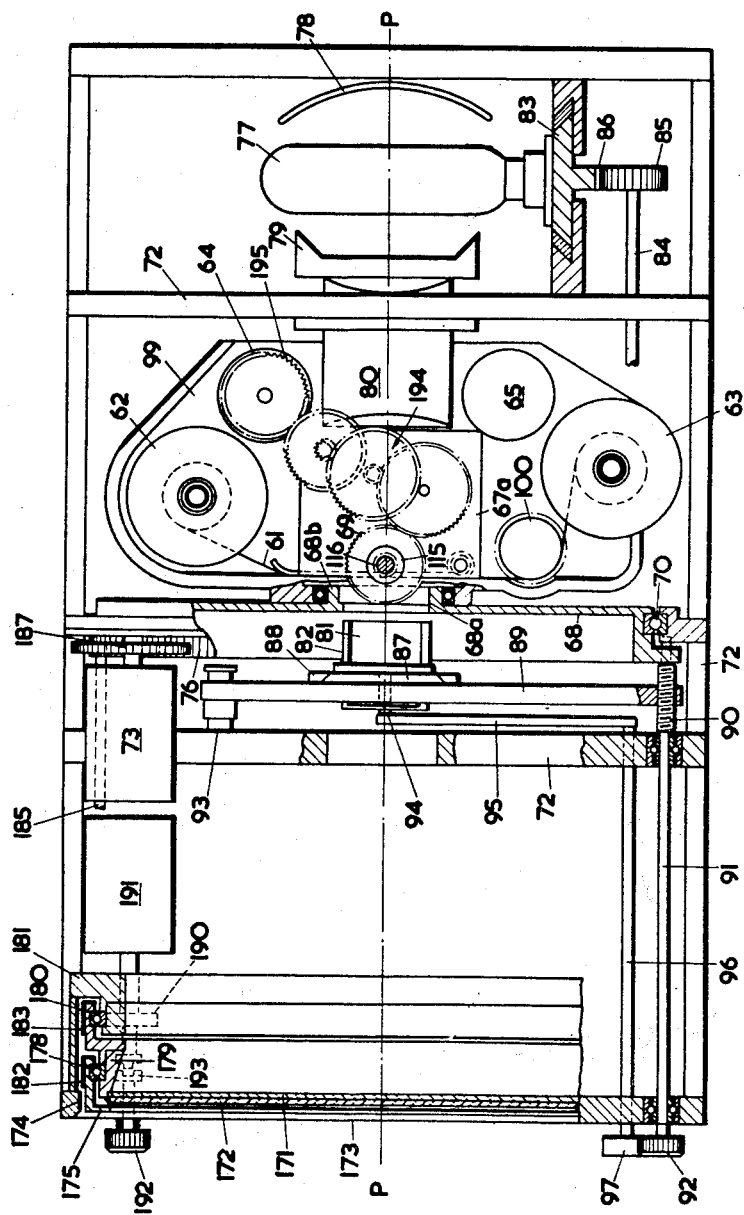
Figure 3:
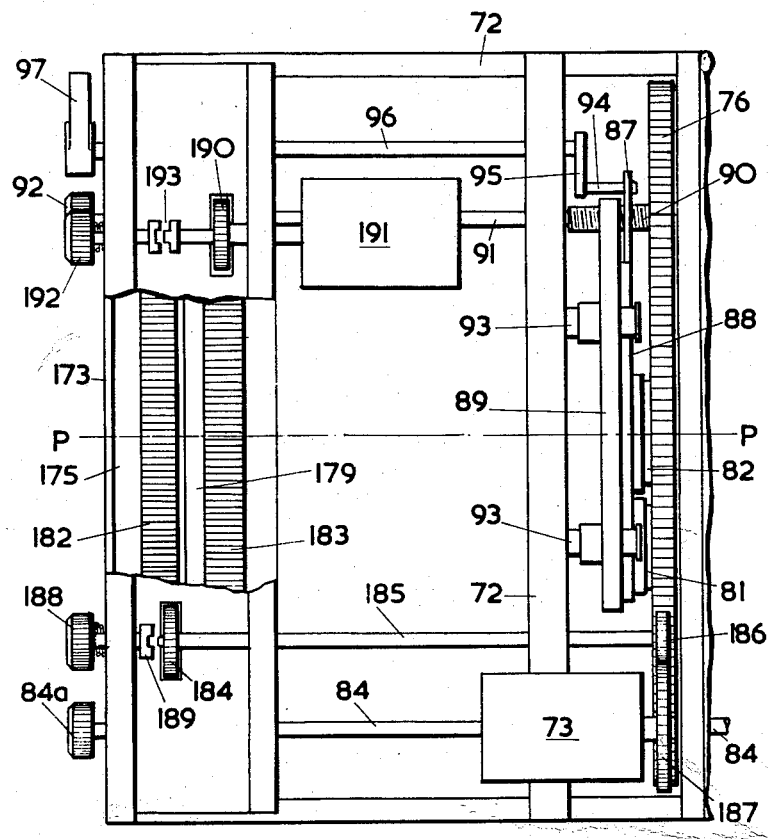
Figure 4:
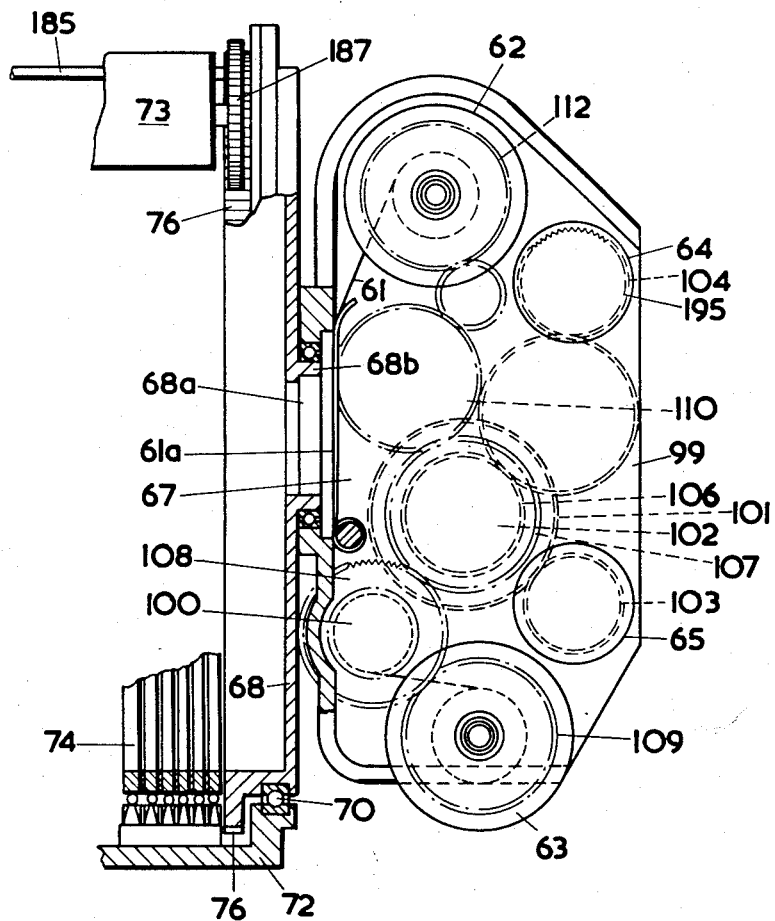
Figure 5:
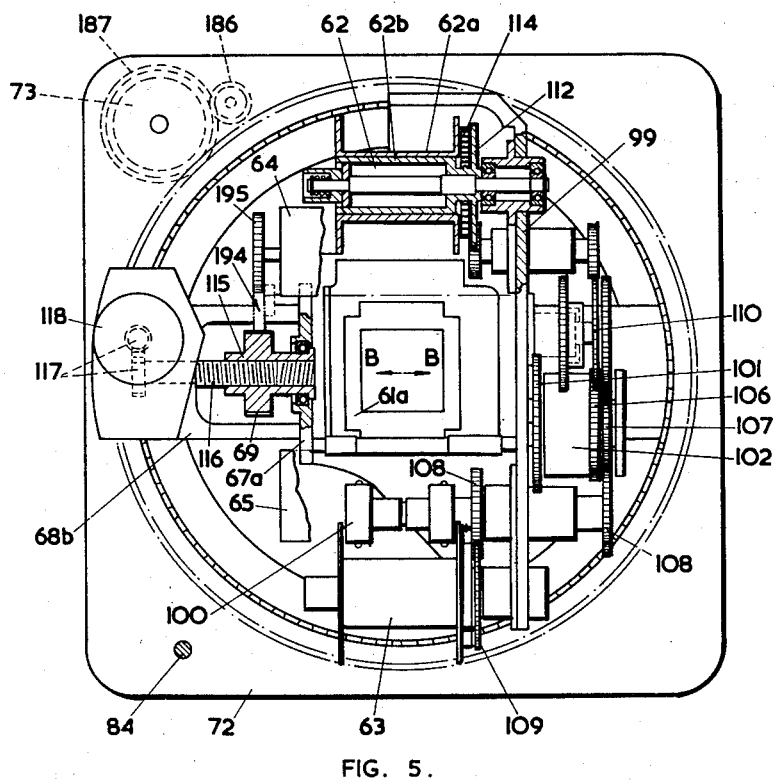
Figure 6:
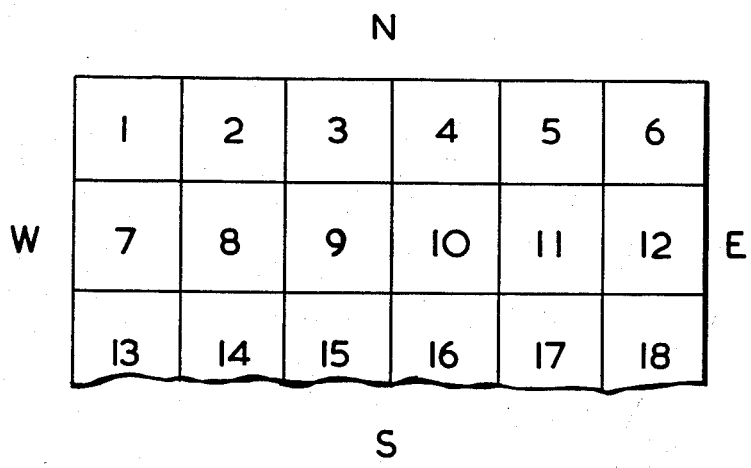
Figure 7:
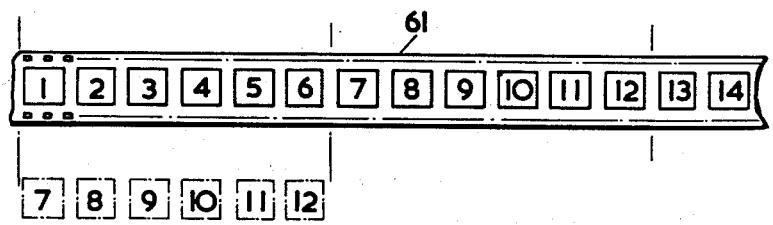
Figure 8:
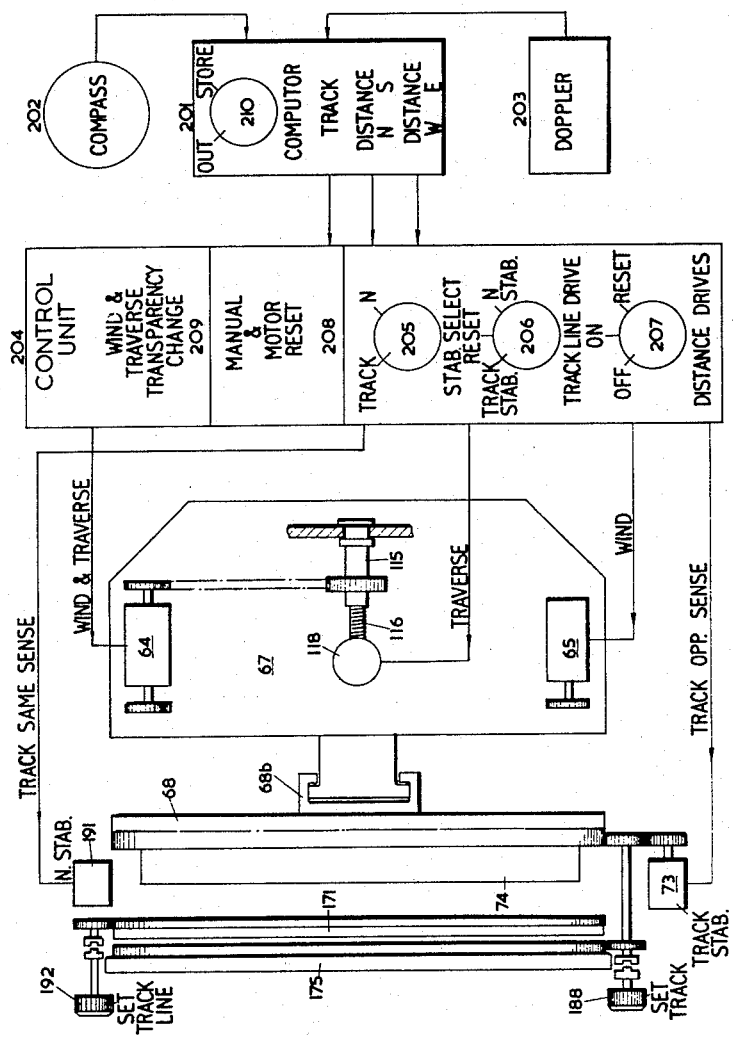
Figure 9:
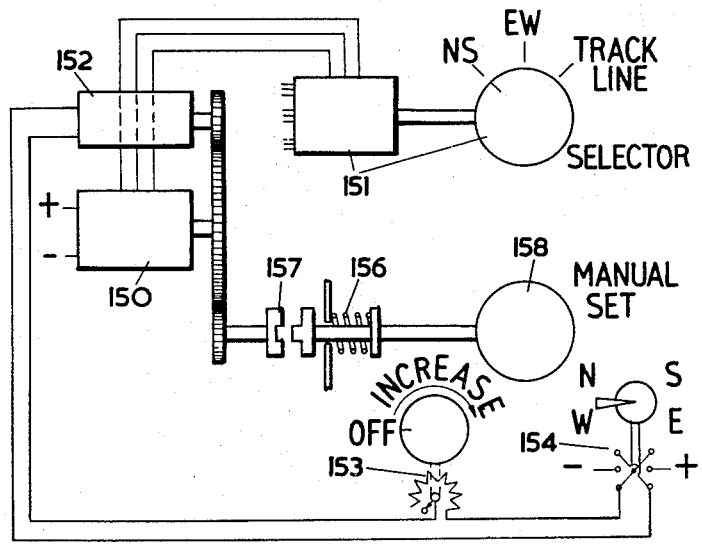
Figure 10:
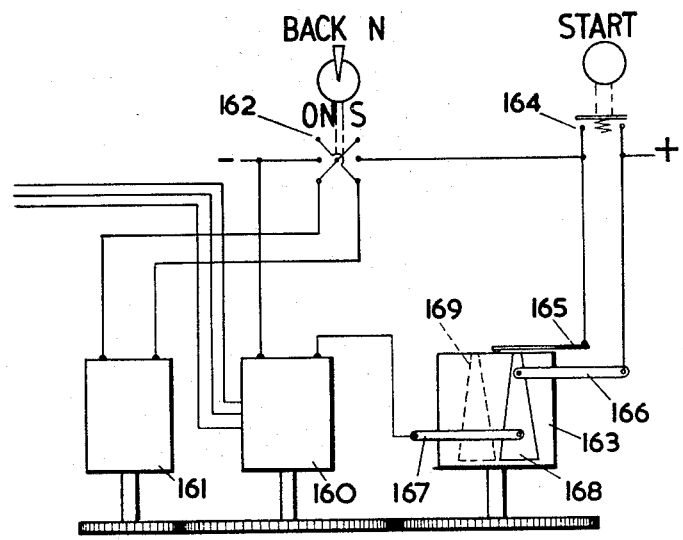
Figure 11:
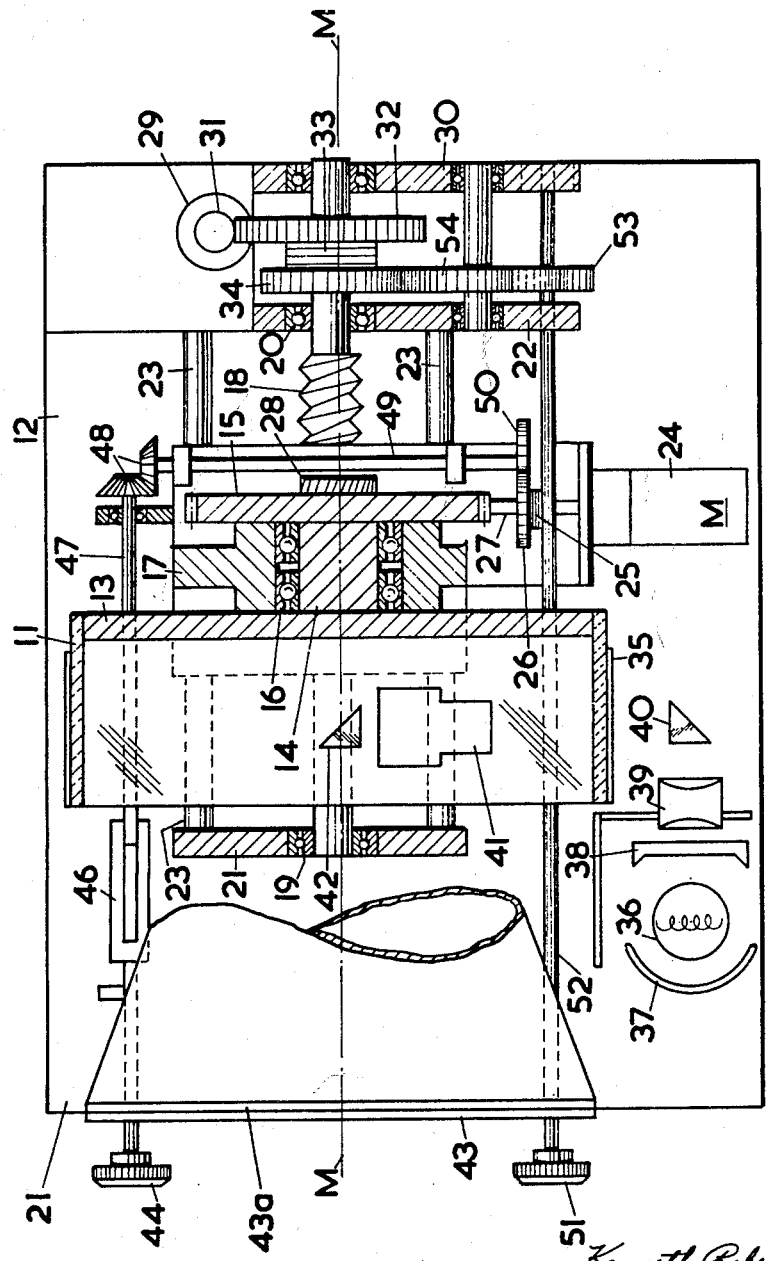
Figure 12:
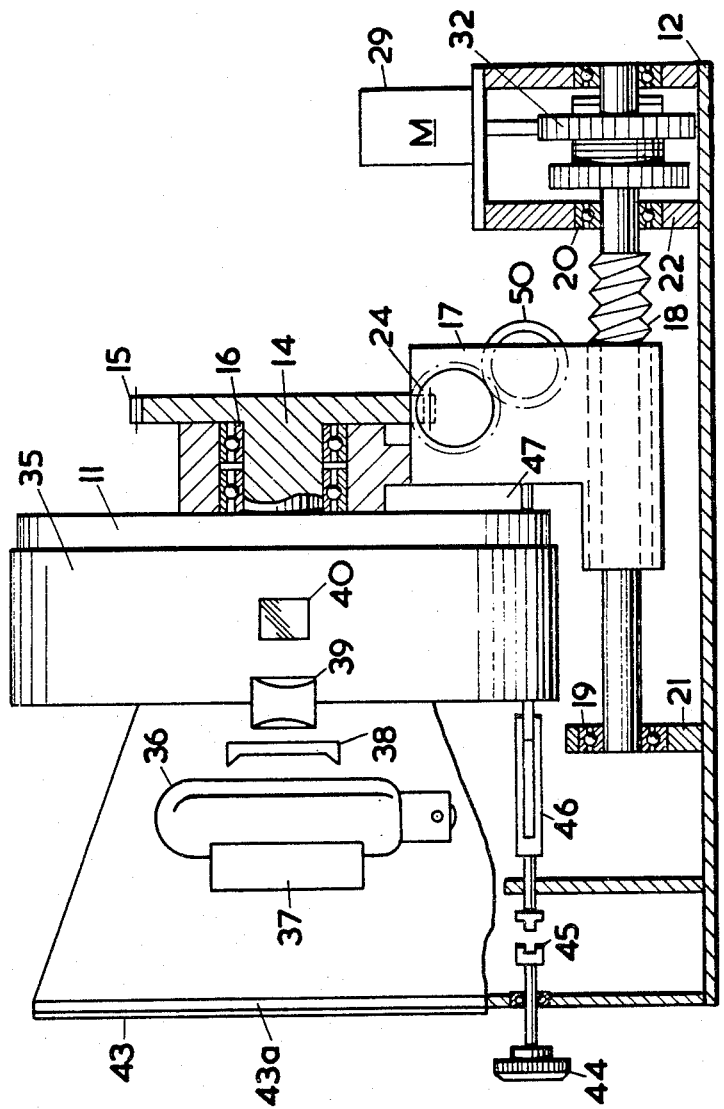
Figure 13:
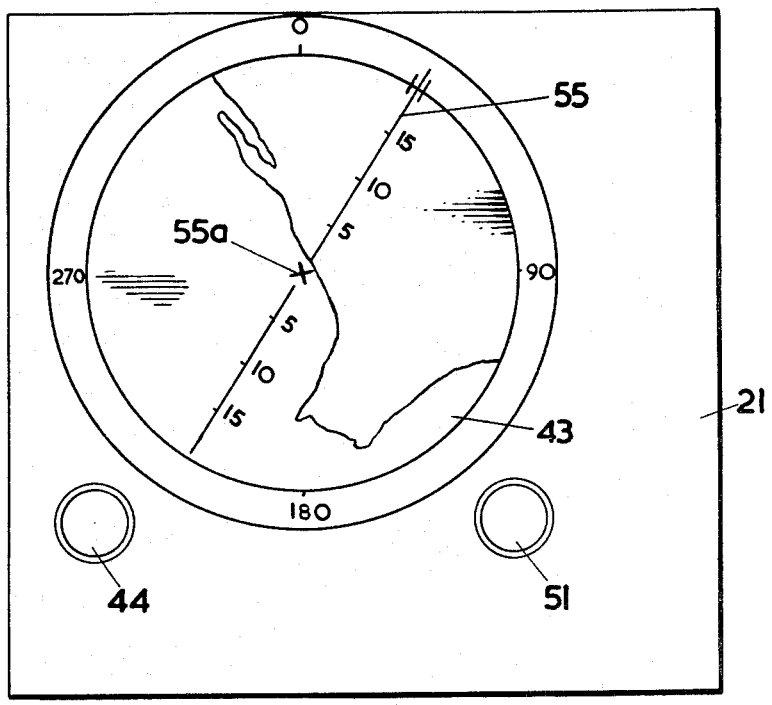

FIGURE 2 a part sectional side elevation of a preferred form of display instrument, FIGURE 3 being a part sectional plan view of the front or left hand portion of FIGURE 2, FIGURE 4 a part sectional side view, and FIGURE 5 a part sectional rear view of the central portion of FIGURE 2;

FIGURES 6 and 7 show, respectively, a terrain area divided into successive groups or "lines" of sections and the manner in which topographical micro-transparencies covering these terrain sections are preferably disposed along the length of a film for use in the display instrument of FIGURES 1 to 5;

FIGURE 8 is a schematic diagram of a complete system including in addition to the display instrument, control means and computing navigational apparatus, FIGURE 9 is a diagram of a "reset" section of the control means of FIGURE 8 and FIGURE 10 is a diagram of a "wind and traverse transparency change" section of the control means of FIGURE 8; whilst FIGURES 11, 12 and 13 show in part sectional plan, in part sectional side elevation and in front elevation, respectively, a more simple form of display instrument.

Referring first to FIGURES 1, 2, 3, 4 and 5 of the drawings, an enlarging optical system and means for supporting for projection and for imparting translational and angular motions to a length of film 61 having a series of topographical micro-transparencies, disposed as successive frames along, its length (FIGURE 7), are carried by a rigid frame or chassis indicated generally, and as to parts thereof, at 72. The enlarging optical system (FIGURE 2) includes a reflector 78, a lamp 77, a heat shield or filter 79, a condenser lens 80, two interchangeable objective lenses 81 and 82 (FIGURES 2 and 3) of different power, and a rear projection screen 171, with a Fresnel lens 172 for producing uniform brightness of the projected image thereon, in a viewing frame 173 at the front of the chassis or frame 72. Gate means for locating the film 61, between two spools 62 and 63, for projection of an image from part of a micro-transparency thereon, are indicated at 61a (FIGURES 4 and 5).

The lenses 81 and 82 (FIGURES 2 and 3) are carried by a slide member 87 movable along guides 88 on a carrier plate 89 which, in turn, is supported slidably on pins 93, 93. This carrier plate has co-operating therewith a lead screw 90 fast on a shaft 91 which terminates in a knob 92 for focus adjustment. Also, a pin 94 extends into a slot in the slide member 87 from a crank arm 95 keyed on a shaft 96 terminating in a lens or scale selector lever 97 for moving the slide member 87 to bring whichever of the lenses 81 and 82 is required at any time into position for use.

The lamp 77 is one of a pair which are mounted side by side in spaced relationship lengthwise of a transverse slide 83 (FIGURE 2) which has a toothed rack 86 meshing with a pinion 85 keyed upon a shaft 84 (part of which is broken away for clearness). This shaft 84 terminates in a lamp changing knob 84a (FIGURES 1 and 3), rotation of which latter, e.g. in the event of failure of the lamp 77, will bring its fellow (not shown in the drawings) into position for use.

At the front of the chassis or frame 72 is a fixed viewing frame 173 formed with a circular opening 174 within which are disposed concentrically an annular compass card 175 and the circular rear projection screen 171 with its Fresnel lens 172. The screen 171 bears a diametral line constituting a track line index 176 and, at its centre, a present position index 177. The annular compass card 175 is carried by a bearing 178 (FIGURE 2) supported by an annular member 179 in which the screen 171 and lens 172 are mounted and which, in turn, is carried by a bearing 180 supported by a flanged member 181 secured to the chassis or frame 72. The annular compass card 175 and the screen carrying member 179 are formed with spur teeth, as indicated at 182 and 183, respectively, for imparting angular motion thereto about the optical axis P—P, on which they are centred. Meshing with the teeth 182 on the compass card 175 is a pinion 184 (FIGURE 3) keyed on a shaft 185 which also has keyed thereon a pinion 186 with which meshes a wheel 187 on the shaft of a "track" repeater motor 73. A "set track" knob 188 and a dog clutch arrangement 189 are provided for manually adjusting the compass card 175. For rotating the track line index 176 the screen carrying member 179 has meshing therewith a pinion 190 on the shaft of a "track line" repeater motor 191, and, a manual "set track line" knob 192 and dog clutch arrangement 193.

Intermediately of its length the chassis or frame 72 supports transversely thereof for rotation in a large diameter bearing 70 and about the optical axis P—P, a circular carrier 68 (FIGURE 4) formed with a central aperture 68a, and having a concentric slip ring assembly, indicated at 74, for affording electrical connections and also transverse guides 68b, along which is movable bodily (as indicated by the double headed arrow B—B, FIGURE 5) a film carriage 67.

The gear wheel 187 on the shaft of the track repeater motor 73 meshes with spur teeth 76 on the carrier 68, so that the annular compass card 175 and the carrier 68 are both rotated, one, by rotation of the set track knob 188 or by operation of the track repeater motor 73.

For traversing the carriage 67 along the guides 68b, a "traverse," repeater motor 118 (FIGURE 5) mounted on the rotatable carrier 68 is coupled by worm and wheel gear 117 to a lead screw 116 which co-operates with a nut member 115 which is mounted on one side wall 67a of the carriage 67 so as to be rotatable, but not displaceable axially, with respect to the latter. This nut member 115 is also coupled by a toothed flange 69 thereof and a gear train, indicated at 194, on the carriage wall 67a, to a wheel 195 keyed on the shaft of a "traverse and wind" repeater motor 64 on the carriage 67. Thus, the carriage 67 will be moved along the guides 68b upon operation of either the traverse repeater motor 118 or the traverse and wind repeater motor 64, but in the latter case the film 61 will at the same time be wound from one of the film spools 62 and 63 to the other as will be made clear hereinafter.

The gate means 61a for locating the film 61 are disposed centrally of the carriage 67 which has film spools 62 and 63 mounted with their axes parallel at opposite sides of said gate means 61a. These spools 62 and 63 are journalled in another side wall 99 of the carriage 67 and each of them (the spool 62 is shown in section in FIGURE 5) comprises an outer part 62a for receiving the film and an inner part, 62b which is driven, said portions 62a and 62b being connected together by a spring 114. These springs permit relative rotation of the inner and outer spool parts and serve to keep the film 61 tight between the spools 62 and 63 in a position precisely determined by a driven film sprocket 100 also journalled in the side wall 99. It will be apparent that the film must be wound, and positioned, accurately in both directions along its length and that because of this the teeth of the sprocket 100 must engage the perforations of the film 61 much more closely than is normally required, for example in a camera or in a cinematograph projector. In the apparatus described the sprocket 100 has normal teeth and is divided intermediately of its length so that the teeth at one end may be angularly displaced in relation to the teeth at the other end so far as permitted by the film perforations in any particular case. In this way any backlash or lost motion between the film and the sprocket is reduced to an insignificant amount.

Also mounted on the carriage 67 is a film "wind" repeater motor 65, on the side wall 99 thereof, toothed gearing connecting this motor 65 and also the traverse and wind repeater motor 64 to drive the film sprocket 100 and the film spools 62 and 63 by way of sprocket gear wheels 108, 108 and spool gear wheels 112 and 109. This gearing includes a differential unit having an outer, input wheel 101, an inner, input wheel 106 and an intermediate output wheel 107. The outer, input wheel 101 is connected with a wheel 103 (FIGURE 4 only) on the shaft of the wind repeater motor 65, the inner output wheel 106 is connected with a wheel 104 (FIGURE 4 only) on the shaft of the traverse and wind motor 64, and the output section 107 of the differential unit 102 is connected with the film sprocket gear wheels 108, 108 and the film spool gear wheels 109 and 112.

Operation of either the wind repeater motor 65 or the traverse and wind repeater motor 64 winds the film 61 between the spools 62 and 63, operation of motor 64, however, also effecting simultaneous traversal of the film 61 located by the gate means 61a, by shifting the carriage 67 along the guides 68b on the carrier 68.

In use, for presenting present position of a craft, the traverse repeater motor 118 and the film wind repeater motor 65 function to impart to a topographical microtransparency located by the gate means 61a, translational motion with the carriage 67 in the one cardinal direction transversely of the film 61 and through said gate means 61a in the other cardinal direction longitudinally of the film.

For the purposes of (a) selecting a required microtransparency on the film 61 (i.e. to bring it into the gate 61a), (b) setting a selected micro-transparency in the two cardinal directions correctly to indicate present position (e.g. before commencing a journey or when a "fix" is obtained during a journey), and (c) changing from the margin of one micro-transparency to the adjacent margin of a neighbouring micro-transparency as may be required during a journey over a terrain area not covered by a single micro-transparency on the film 61, provision is made for operation of the wind, traverse, and wind and traverse, repeater motors 65, 118 and 64 manually or under manual control. Such provision is described hereinafter with reference to FIGURES 8, 9 and 10 of the accompanying drawings.

For operation in geographically, say North, stabilised mode, with the viewing frame 173, representative of an "earth" reference frame and only translational motion of the image in the viewing frame 173, the track repeater motor 73 is inoperative and the carrier 68 remains stationary about the optical axis P—P with the guides 68a thereof say vertical, so that the cardinal directions of the translational motions due to the functioning of the traverse and wind repeater motors 118 and 65 are sideways (say NS) and up and down (say WE), respectively, with respect to the viewing frame 173, also the annular compass card 175 remains stationary, say with N at the top of the viewing frame 173 as shown in FIGURE 1. In this mode, however, the track line repeater motor 191 may advantageously be operative under the control of a computed navigational track signal to rotate the rear projection screen 171 and so the track line index 176 thereon in accordance with track change to read track against the stationary annular compass card 175. Provision for setting the track line index 176 manually or under manual control is also described hereinafter with particular reference to FIGURES 8, 9 and 10 of the drawings.

For operation in track-stablised mode with the viewing frame representative of a "craft" reference frame and the direction of resultant translational motion of the topographical image across the viewing frame 173 maintained constant (say from top to bottom of the frame 173) for all tracks, the track repeater motor 73 is operative under the control of a computed navigational track signal to displace the carrier 68 and the annular compass card 175 together about the optical axis P—P in accordance with track change but in the opposite sense. The traverse and wind repeater motors 118 and 65 continue to impart translational motions in the two cardinal directions to the topographical image in the viewing frame 173, but the direction of the resultant translational motion of the image is always the same with respect to the frame 173, say from top to bottom. Also the annular compass card 175 indicates track, say at the top of the frame 173, against the appropriately positioned but stationary, track line index 176. Provision for setting the direction of resultant translational motion of the projected picture, i.e. track, and at the same time the angular position of the annular compass card 175, manually or under manual control is described below with particular reference to FIGURES 8, 9, and 10.

Referring now to FIGURES 6 and 7 of the drawings, the former represents a terrain area which is divided, along W-E parallels of latitude, into equal strips or groups of consecutively numbered equal sections 1–6, 7–12, 13–18, .... The film 61, as shown in FIGURE 7, bears topographical micro-transparencies corresponding to the sections of the terrain are of FIGURE 6 and which are correspondingly numbered consecutively, and disposed in corresponding groups 1–6, 7–12 and so on, placed end to end along the length of the film 61. As each group contains the same number of micro-transparencies, the distance through which the film must be moved longitudinally (i.e. wound on or back from one to the other of the spools 62 and 63) to change from presentation of present position of a craft in one terrain section, FIGURE 6, to such presentation in the adjacent terrain section to the South or North will always be the same. For example, change from No. 3 transparency, FIGURE 7, with presentation of present position in No. 3 terrain section FIGURE 6, to say No. 9 transparency with presentation of present position in No. 9 terrain section, or vice versa, will be effected by winding the film on (i.e. W) or back (i.e. E) for six transparencies. In some cases it may be convenient for the adjacent terrain area sections covered by the transparencies to overlap one another to a small extent in either or both directions, for example No. 8 transparency may cover in addition to No. 8 terrain section the adjacent marginal parts of any or all of the terrain sections Nos. 2, 14, 7 and 9.

Iit will be apparent that, in use, changes from one micro-transparency to another micro-transparency which covers the immediately adjacent terrain area in the direction (NS in the example of FIGURE 7) laterally of the film, will generally be required to be made from the bottom, so to speak, of the one micro-transparency to the top of the other, or vice versa, and will thus involve not only winding the film on or back a given number of transparencies along its length, but also traversing the film laterally thereof through a distance substantially equal to the dimension of a transparency across the width of the film. By arranging the micro-transparencies on the film in the manner shown, both the winding distance and the traverse distance required for such changes are always the same and it is therefore possible and very convenient to perform the winding and traversing simultaneously say by means of a single motor and two driving connections of such relative speed ratios that both the winding motion and the relatively small traverse motion are completed in the same time.

In the display instrument of FIGURES 1 to 5 of the drawings this function is fulfilled by the traverse and film wind repeater motor 64 whose driving connections to the film sprocket 100 and to the carriage 67, respectively, are of appropriate speed ratios. Manually controlled means for effecting such transparency changes and also for setting a transparency accurately for presentation of present position after each such change are described below with reference to FIGURES 8, 9 and 10.

Referring now to FIGURE 8, here a Computer 201 fed from a Compass 202 with heading information and from a Doppler system 203 of known type affording ground speed and drift angle information, itself affords by way of appropriate signal transmitting devices (not shown) therein, signals according to Distance N,S, Distance W,E and Track. These signals are fed to a Control Unit, indicated generally at 204, and thence to the various repeater motors to control their operation as required. The Computer 201 is of a type having provision for storing the signals in known manner when required.

The Control Unit 204 includes a Stabilized (Stab.) Select switch 205 for selecting operation in North stabilised or Track Stabilised mode as required, two three-position switches 205 and 206 labelled Track Line Drive and Distance Drives whose functions are described below, a Manual or Motor Reset section 208 affording manual and manually controlled motor drives by means described below with reference to FIGURE 9, and, a Traverse and Wind Transparency Change section 209 for controlling the wind and traverse repeater motor 64 and which is described below with reference to FIGURE 10.

The Manual or Motor Reset section 208 of the Control Unit (FIGURE 9) includes a signal transmitter 150 for connection by way of a three way Selector switch 151 to operate the traverse repeater motor 118 for N.S setting of the projected image, the wind repeater motor 65 for W.E transparency change or W.E image setting, or to operate the track line repeater motor 191, as required. This section also includes a motor 152 geared to drive the transmitter 150 and connected with a D.C. supply by way of a variable resistance 153 having an Off position for starting and stopping and controlling the speed of the motor 152 and a reversing switch 154; and, further, a Manual Set knob 158 which when depressed against a spring 156 engages a dog clutch 157, and then rotated drives the transmitter manually.

The manual control afforded by the Manual Set knob 158 enables accurate translational adjustments of the projected image and also transparency changes along the length of the film to be made as required and the motor 152 enables the track line index 176 to be moved angularly at a higher speed than can be achieved, readily or at all, by use of the manual Set Track Line knob 192 on the viewing frame 173. This latter is a useful facility in practice because it enables the track line index 176 to be used so to speak as a pointer. It is found that the manual adjustment of the carrier 68 and compass card 175 by the Set Track knob 118 of the viewing frame 173 is sufficient in practice, and so the Selector switch 151 does not have a "Track" position, but only the three NS, EW and Track Line positions indicated.

The Wind and Traverse Transparency change section 209 of the Control Unit 204 (see FIGURE 10) comprises a transmitter 160 connected only to the traverse and wind repeater motor 64, a motor 161 connected with a D.C. supply by way of a reversing switch 162, a commutator device 163, and a push-button type Start switch 164. The motor 161 is geared to drive both the transmitter 160 and the commutator device 163 which latter has associated therewith two brushes 165 and 166 connected across the Start switch 164 and a third brush 167 connected in the supply circuit to the transmitter 160. Also, the commutator 163 has two diametrically opposite wedge-shaped inserts 168 and 169 of insulating material apart from which it is electrically conductive. When this section of the Control Unit is inoperative, the Start switch 164 is open and the motor and transmitter brushes 166 and 167 bear upon one of the insulating inserts, 168 as shown, of the commutator 163, actually it will be seen, at narrower and wider parts thereof, respectively. For operation to effect a transparency change as set forth above, the switch 164 is depressed to complete the supply circuit to the motor 161 and held so until said circuit is established also by the insulating insert 168 clearing the brush 166 which latter then bears upon the conductive body of the commutator 163 and so short circuits the switch 164 via the brush 165 which at all times bears upon said body. As the motor 161 continues to run the insulating insert 168 subsequently clears the transmitter brush 167 as well, thus establishing the supply circuit to the transmitter 160 and so initiating operation of the traverse and wind repeater motor 64 and maintaining it operative until (as the simultaneous traverse and wind motions of the carriage 67 and the film 61 between the spools 62 and 63 thereon are completed) the other wedge shaped insulating insert 169 rides under the transmitter brush 167 at a wider part thereof and so interrupts the transmitter supply circuit and stops the traverse and wind repeater motor 64. The motor 161 then remains operative until the narrower part of the insulating insert 169 rides under the motor brush 166 so interrupts the motor supply circuit once again.

Referring once again to FIGURE 8, the Distance Drives switch 207 of the Control Unit 204 has in addition to an Off position, an On position for feeding the Distance NS and Distance WE outputs from the transmitters (not shown) of the Computer 201 to the traverse and the wind repeater motors 118 and 65, and a Reset position in which said motors 118 and 65 are connected with the Manual and Motor Reset section 208 of the Control Unit 204. The Track Line Drive switch 206 has a Track Stabilized or holding position in which the track line repeater motor 191 is held against rotation for operation in track stabilised mode, an N position for feeding the track output from the Computer 201 to the track line repeater motor 191, and a Reset position in which the track line repeater motor 191 is connected to the Manual and Motor Reset section 208 of the Control Unit 204. The Stabilized (Stab.) Select switch 205 of the Control Unit 204 has a Track position for feeding the Track output from the Computer 201 in a reverse sense to the track repeater motor 73, and an N position in which a holding signal is fed to the track line repeater motor 191. The Computer 201 has a two position switch 210 fo rswitching its outputs to the Control Unit 204 or into store as required.

Here it is to be observed that when the distance signals are re-applied to the corresponding repeater motors after having been stored in the Computer 201, for example after a transparency change has been made during a journey, said repeater motors will run at increased speed until the corresponding computer stores are so to speak empty.

It is also to be observed that the precise controls and the manner in which they operate are capable of wide variation, and that, although a self-contained navigation system including a Compass and a Doppler system has been instanced above, many other systems, including those involving the use of ground stations, may be used instead to operate a navigational display instrument according to the invention, which may advantageously be used also in simulator apparatus for example for training purposes.

Referring now to FIGURES 11, 12 and 13 the more simple form of display instrument there shown has a rigid chassis or frame indicated at 12 by which the operative parts are carried. The optical system comprises a reflector 37, lamp 36, heat shield 38, condenser lens 39, two reflecting prisms 40 and 42, an objective lens 41 and a circular rear projection screen 43 having a Fresnel type lens indicated at 43a of known type to produce substantially uniform brightness of the image. The screen is mounted in a circular opening in a viewing frame 21 (FIGURE 13) at the front of the chassis or frame 12.

In this case a length of film 35 bearing topographical micro-transparencies distributed along its length is supported by a transparent hollow cylinder 11 around which it extends circumferentially.

This cylinder 11 is fitted securely to a rigid disc 13 which is fast on one end of a shaft 14 which has an integral worm wheel 15 at its other end and is journalled in bearings 16 in a carriage 17 which, in turn, is slidable along two parallel spaced carrier rods 23, 23.

The cylinder 11 is thus positioned with part of its transparent curved wall interposed in the light path between the two prisms 40, 42 of the enlarging optical system with the axis of the latter extending radially therethrough, so as to locate a micro-transparency on the film 35 for projection of an image therefrom.

The carriage 17 is in driving connection (FIGURE 12) with a lead screw 18 journalled in bearings 19 and 20. A traverse repeater motor 29 on the chassis or frame 12 is coupled by a worm 31 (FIGURE 11) and wheel 32 and a clutch 33 loose on the stem of the lead screw 18 with a gear wheel 34 fast on said stem, to drive the lead screw 18 and so move the cylinder 11 axially for traverse motion of the film 35 in the direction of its width. For manual adjustment or setting in this direction a knob 51 is coupled to the lead screw 18 by a shaft 52, gear wheel 53 fast thereon, an idler wheel 54 and the above mentioned gear wheel 34, a dog clutch (not shown but similar to that indicated at 45 FIGURE 2) being included in this manual drive connection.

Conveniently, the topographical micro-transparencies on the film 35 are disposed with their WE dimensions laterally thereof and so parallel with the axis of the cylinder 61 so that axial motion of the latter produces WE motion of the projected image across the viewing frame 21.

A "wind" repeater motor 24 mounted on the carriage 17, is coupled by a clutch 25 (FIGURE 11), with a gear wheel 26, shaft 27 and worm 28 meshing with the worm-wheel 15 fast on the shaft 14, to rotate the cylinder 11 about its axis, conveniently for NS motion of the projected image across the viewing frame 21. Manual adjustment or setting in this direction is afforded by a knob 44, dog clutch and spline arrangements 45 and 46, a shaft 47 and (see FIGURE 11) bevel wheels 48, a cross shaft 49 which is journalled on the carriage 17 and has fast thereon a gear wheel 50 meshing with the wheel 26 on the shaft 27 of the worm 28.

It will be seen that this display apparatus is operative only in geographically stabilised mode, with the viewing frame 21 representative of an "earth" reference frame and only translational motion of the image in the viewing frame 21. In this instrument also the screen 43 has a track line index 55 in the form of a diametral line and a central present position index 55a and is rotatable manually by means (not shown) to displace the track line index 55 about the optical axis.

It will be aparent to those skilled in the art that many modifications are possible without departure from the scope of the following claims. For example, a cylindrical film carrier like that of the instrument of FIGURES 11, 12 and 13 may be mounted with its axis vertical or horizontally at right angles to the optical axis of a projection system like that of the instrument shown in FIGURES 1 to 5 of the drawings and of which the reflector, lamp and condenser lens are accommodated within the cylindrical carrier. Also, for operation in track stabilised mode, optical means of known type may be employed for angularly moving the projected image about the optical axis of the enlarging projection system. Moreover, apparatus according to the invention is not limited to a control unit affording precisely the same facilities as those of the control unit described above with reference to FIGURES 8, 9 and 10 of the accompanying drawings.

Standard 35 millimeter colour film stock has been found very suitable for the micro-transparencies used in apparatus according to this invention. Using a typical map printed in colour at a scale of 1:500,000 as an original, a reduction of 20 diameters can be achieved to produce a micro-transparency at a scale of some 120 nautical miles to the inch which can be used to produce a picture on the screen at the original scale of 1:500,000 with little or no loss of detail. A strip of film 10½ feet long will accommodate a sufficient number of such colour micro-transparencies at the 1:500,000 scale to cover for example the greater part of Western Europe, e.g. from longitude 5°30′ West (Lands End) to longitude 16°30′ East (Sweden) and latitude 60° North (Shetland) to latitude 34° N. (North Africa). Such a film strip can readily be accommodated on one inch diameter spools so that even greater coverage can readily be provided when required by using larger spools.

In one version of the display instrument shown in FIGURES 1 to 5 the useful area of the screen is 6½ inches in diameter and the overall dimension of the viewing frame are 7⅜ by 7⅜ inches, the instrument being some 15 inches from front to back. These dimensions are not the smallest possible, however, and considerable reduction is possible particularly in depth from front to back, the frontal dimensions being necessarily determined by the required size of the topographical image. The projected topographical image covers an area of about 45 nautical miles in diameter at the 1:500,000 scale using one of the two objective lenses provided, and when the other objective lens is in use the effective scale is 1:1,000,000 and an increased coverage of about 90 nautical miles in diameter is obtained which is found, in practice, to be a very valuable facility for taking a look ahead. It will be remembered, in this connection, that the track line index is useful to provide a plot ahead showing pictorially where the route will lie if a prevailing course is held. If the track line index should not line over a required point within say 20 or 40 nautical miles from present position, the course change necessary to reach that point can be read off directly from the annular compass card by which the picture is surrounded.

I claim:

1. Navigation apparatus for displaying topographically the present position of a craft as defined by two computed navigational signals corresponding respectively to distance traveled in two cardinal directions, which includes a frame structure defining a front end, rear end and sides interconnecting said ends, lamp means positioned adjacent the rear end, the front end defining a viewing frame having a viewing screen within same, a lens means and mounting means therefor located centrally of the frame structure, the lamp means, lens means and the viewing frame being centered on an optical axis extending through said frame structure centrally thereof from end to end, carriage means within the frame structure between the lamp means and the lens means, the carriage means being mounted for movement transverse to the optical axis, the carriage means including film guide means and film moving means for moving a film strip in translation between spools across the optical axis in a direction at right angles to the aforesaid transverse direction of movement of the carriage means, means supporting a track line indicator for rotation about said optical axis, a compass card concentric with said screen, means for moving the lens mounting means in translation parallel to said optical axis for focussing purposes, and means supporting the track line indicator having a ring gear about the periphery thereof, a pinion gear engaging said ring gear, and a shaft parallel to the optical axis carrying the pinion gear, motor means within the frame structure coupled to the shaft for automatically driving same, and manual knob means protruding from the front end of the frame structure and engageable with said shaft for selectively turning same.

2. Navigation apparatus for displaying topographically the present position of a craft as defined by two computed navigational signals corresponding respectively to distance travelled in two cardinal directions, which includes, a fixed viewing frame, an enlarging optical projection system having a rear projection screen in said frame, present position index means indicative of present position at a central point in the screen where the latter is intersected by the optical axis of said projection system, means for locating a length of film bearing as successive frames uniformly along its length a series of topographical micro-transparencies each covering a corresponding section of a much larger terrain area covered by the series, for projection of an image from part at a time of a micro-transparency on the film, said locating means including a carrier having guide means extending across it, a carriage mounted on said carrier for movement along said guide means, the carriage including a film spool, sprocket and gate means for supporting a film with a portion thereof extending through the gate means in a direction at right angles to the guide means, signal operated traverse motor means for control by one of said signals to move the carriage along the guide means, signal operated wind motor means for control by the other of said signals to wind the film through the gate means under the control of a sprocket, the apparatus also including track line index means representative of a straight line across the screen through the said central point in the latter for indicating track and also future positions of a craft holding a straight line course, track line motor means of signal operated type for angularly moving the track line index means about said central point on the screen under the control of a computed navigational signal corresponding to track heading, an annular compass card centered about said central point on the screen for indicating track heading, signal means for affording signals of the same character as the computed navigational signals used, manually controlled motor means for operating said signal means, wind and traverse motor means of signal operated type for winding the film through the gate means for a distance equal to a given number of micro-transparencies along its length and simultaneously moving the carriage along the guide means through a distance equal substantially to the dimension of a micro-transparency across the width of the film, and, automatic signal means operable at will to apply an operating signal to the wind and traverse motor means and to remove said signal from said means at the expiry of a time period appropriate for movement of the film longitudinally through the given number of micro-transparencies and transversely through a distance equal substantially to the micro-transparency dimension transversely of the film.

3. Navigation apparatus for displaying topographically the present position of a craft as defined by two computed navigational signals corresponding respectively to distance travelled in two cardinal directions, which includes a frame structure defining a front end, rear end and sides interconnecting said ends, lamp means positioned adjacent the rear end, the front end defining a viewing frame having a viewing screen within same, a lens means and mounting means therefor located centrally of the frame structure, the lamp means, lens means and the viewing frame being centered on an optical axis extending through said frame structure centrally thereof from end to end, carriage means within the frame structure between the lamp means and the lens means, the carriage means being mounted for movement transverse to the optical axis, the carriage means including film guide means and film moving means for moving a film strip in translation between spools across the optical axis in a direction at right angles to the aforesaid transverse direction of movement of the carriage means, the means mounting the carriage means being rotatable about the optical axis, a compass card concentric with said screen and movable in rotation relative to the frame structure, means for moving the lens mounting means in translation parallel to said optical axis for focussing purposes, the compass card and rotatable carriage mounting means each having a ring gear about the periphery thereof, a separate pinion gear engaging each of said ring gears, and shafts parallel to the optical axis carrying the pinion gears, motor means within the frame structure coupled to the respective shafts for automatically driving same, and manual knob means protruding from the front end of the frame structure and engageable with said shafts for selectively turning same.

4. Navigation apparatus for displaying topographically the present position of a craft as defined by two computed navigational signals corresponding respectively to distance travelled in two cardinal directions, which includes, a fixed viewing frame, an enlarging optical projection system having a rear projection screen in said frame, present position index means indicative of present position at a central point in the screen where the latter is intersected by the optical axis of said projection system, means for locating a length of film bearing as successive frames uniformly along its length a series of topographical micro-transparencies each covering a corresponding section of a much larger terrain area covered by the series, for projection of an image from part at a time of a mirco-transparency on the film, said locating means including a carrier having guide means extending across it, a carriage on said guide means having film spool, sprocket and gate means for supporting a film with a portion thereof extending through the gate means in a direction at right angles to the guide means, signal operated traverse motor means for control by one of said signals to move the carriage along the guide means, signal operated wind motor means for control by the other of said signals to wind the film through the gate means under the control of a sprocket, the apparatus also including track line index means representative of a straight line across the screen through the said central point in the latter for indicating track and also future positions of a craft holding a straight line course, an annular compass card centred about said central point on the screen for indicating track heading, bearing means supporting the carrier for rotation about the optical axis of the projection system, carrier motor means of signal operated type for rotating the carrier about the optical axis under the control of a computed navigational signal corresponding to track heading, but in the opposite sense to track heading change, bearing means supporting the compass card for rotation about the optical axis, means coupling the compass card for angular movement about said axis together with the carrier, signal means for affording signals of the same character as the computed navigational signals used, manually controlled motor means for operating said signal means, wind and traverse motor means of signal operated type for winding the film through the gate means for a distance equal to a given number of micro-transparencies along its length and simultaneously moving the carriage along the guide means through a distance equal substantially to the dimension of a micro-transparency across the width of the film, and, automatic signal means operable at will to apply an operating signal to the wind and traverse motor means and to remove said signal from said means at the expiry of a time period appropriate for movement of the film longitudinally through the given number of micro-transparencies and transversely through a distance equal substantially to the micro-transparency dimension transversely of the film.

5. Navigation apparatus for displaying topographically the present position of a craft as defined by two computed navigational signals corresponding respectively to distance travelled in two cardinal directions, which includes a frame structure defining a front end, rear end and sides interconnecting said ends, lamp means positioned adjacent the rear end, the front end defining a viewing frame having a viewing screen within same, a lens means and mounting means therefor located centrally of the frame structure, the lamp means, lens means and the viewing frame being centered on an optical axis extending through said frame structure centrally thereof from end to end, carriage means within the frame structure between the lamp means and the lens means, the carriage means being mounted for movement transverse to the optical axis, the carriage means including film guide means and film moving means for moving a film strip in translation between spools across the optical axis in a direction at right angles to the aforesaid transverse direction of movement of the carriage means, the means mounting the carriage means being rotatable about the optical axis, a compass card concentric with said screen and movable in rotation relative to the frame structure, means supporting a track line indicator for rotation about said optical axis, means for moving the lens mounting means in translation parallel to said optical axis for focussing purposes, the compass card and rotatable carriage mounting and track line indicator means each having a ring gear about the periphery thereof, a separate pinion gear engaging each of said ring gears, and shafts parallel to the optical axis carrying the pinion gears, motor means within the frame structure coupled to the respective shafts for automatically driving same, and manual knob means protruding from the front end of the frame structure and engageable with said shafts for selectively turning same.

References Cited in the file of this patent

UNITED STATES PATENTS

| | | |
|---|---|---|
| 2,169,532 | Jensen | Aug. 15, 1939 |
| 2,267,649 | Graves | Dec. 23, 1941 |
| 2,314,497 | Hargrave et al. | Mar. 23, 1943 |
| 2,814,199 | Waldorf et al. | Nov. 26, 1957 |
| 2,836,816 | Allison et al. | May 27, 1958 |
| 2,960,906 | Fogel | Nov. 22, 1960 |